United States Patent
Parikh et al.

(10) Patent No.: US 12,200,614 B2
(45) Date of Patent: Jan. 14, 2025

(54) NETWORK SLICING FOR PRIVATE CELLULAR NETWORKS

(71) Applicant: AT&T Intellectual Property I, L.P., Atlanta, GA (US)

(72) Inventors: Anisa Parikh, Holmdel, NJ (US); Sekar Ganesan, Ocean, NJ (US); Christina Cacioppo, Freehold, NJ (US); Sreejith Menon, Herndon, VA (US); John Hursey, Lawrenceville, GA (US); Satyendra Tripathi, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 389 days.

(21) Appl. No.: 17/652,438

(22) Filed: Feb. 24, 2022

(65) Prior Publication Data
US 2023/0269655 A1    Aug. 24, 2023

(51) Int. Cl.
*H04W 48/16* (2009.01)
*H04W 12/06* (2021.01)
*H04W 12/37* (2021.01)
*H04W 48/18* (2009.01)

(52) U.S. Cl.
CPC .......... *H04W 48/16* (2013.01); *H04W 12/06* (2013.01); *H04W 12/37* (2021.01); *H04W 48/18* (2013.01)

(58) Field of Classification Search
CPC ..... H04W 48/16; H04W 12/06; H04W 12/37; H04W 48/18
See application file for complete search history.

(56) References Cited

U.S. PATENT DOCUMENTS

| | | | |
|---|---|---|---|
| 2018/0376414 A1* | 12/2018 | Zeng | H04W 8/02 |
| 2020/0267623 A1* | 8/2020 | Altay | H04L 45/64 |
| 2020/0359224 A1* | 11/2020 | Gibson | H04W 16/02 |
| 2021/0051070 A1* | 2/2021 | Akman | H04L 41/0895 |
| 2021/0105196 A1* | 4/2021 | Dao | H04L 43/026 |
| 2021/0204207 A1* | 7/2021 | Fiorese | H04L 67/146 |
| 2021/0211975 A1* | 7/2021 | Prabhakar | H04W 8/06 |
| 2021/0359912 A1* | 11/2021 | Tervonen | H04W 28/16 |
| 2022/0007180 A1* | 1/2022 | Liao | H04L 67/14 |
| 2022/0201593 A1* | 6/2022 | Baek | H04W 48/10 |
| 2022/0210722 A1* | 6/2022 | Saini | H04W 8/183 |
| 2022/0225093 A1* | 7/2022 | Sasi | H04W 12/06 |
| 2022/0311744 A1* | 9/2022 | Shevade | H04W 12/06 |
| 2023/0022184 A1* | 1/2023 | Sajjan | H04L 67/141 |
| 2023/0164113 A1* | 5/2023 | Gupta | H04L 63/0272 709/245 |

(Continued)

*Primary Examiner* — Fahmida S Chowdhury

(57) ABSTRACT

The described technology is generally directed towards network slicing for private cellular networks (PCNs). Network slicing can be leveraged as described herein to meet security requirements and/or other policies applicable to PCNs. Network slices implemented according to this disclosure can comprise a private network slice, a public network slice, and a public safety network slice. User equipment can be provisioned with slice identifiers for the network slices, and applications at the user equipment can specify an appropriate slice identifier for their network communications. Network equipment can be configured to route application traffic to a specified slice and to allocate network resources according to the specified slice, as well as to implement security and other policies according to the specified slice.

20 Claims, 9 Drawing Sheets

(56) References Cited

U.S. PATENT DOCUMENTS

2023/0232216 A1\* 7/2023 Gundavelli ........... H04W 12/35
  370/329
2024/0015175 A1\* 1/2024 Hakala .................. H04L 63/102
2024/0121572 A1\* 4/2024 Ramachandran ..... H04W 4/021

\* cited by examiner

NETWORK SLICING FOR PRIVATE CELLULAR NETWORKS

TECHNICAL FIELD

The subject application is related to cellular communication networks, and more particularly, to private cellular communication networks.

BACKGROUND

A private cellular network (PCN) uses cellular network technologies to create a dedicated network within a geographic area. A PCN can use cellular technologies, such as the long-term evolution (LTE) or fifth generation (5G) technologies that are used by the public mobile operators, to provide a wireless network at, e.g., premises of a business, college, or government complex. In some cases, a PCN can operate similarly to a wireless local area network (LAN) (e.g., Wi-Fi) but can use mobile technology and spectrum to support more advanced uses than those supported by wireless LAN technologies.

Conventional choices for deploying wireless broadband connectivity, such as Wi-Fi and public cellular networks, may not deliver the efficiency, control and security that some enterprises need for their business operations. Example benefits of PCNs include improved control and management of connectivity, increased availability and coverage, enhanced security, control over operating processes, and controlled latency.

PCNs are currently being deployed as disparate networks, with network slicing being applied only to the public networks. As an example, some PCNs leverage a multi-operator core network (MOCN) based architecture. Such implementations may include a shared radio Access Network (RAN) at the PCN location, a private core managed by the PCN operator, and a mobility core operated by a public network operator. A MOCN segregates private traffic from traffic destined to public networks. User equipment (UEs) can be provisioned with dual subscriber identity modules (SIMs), or with one SIM with dual personas, so the UEs can attach to both the private core and mobility core.

Such MOCN based architectures have numerous drawbacks. For example, they do not provide the ability to guarantee all the service level agreements (SLAs) required for each network type. Additionally, MOCN based architectures pose several UE related issues. There are impacts to call flow, e.g., if one SIM or persona has an active call, calls to the other SIM or persona may not be delivered. Also, if a UE moves out of range from a current network, it may remain attached to, e.g., the mobility core, and may require a restart.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
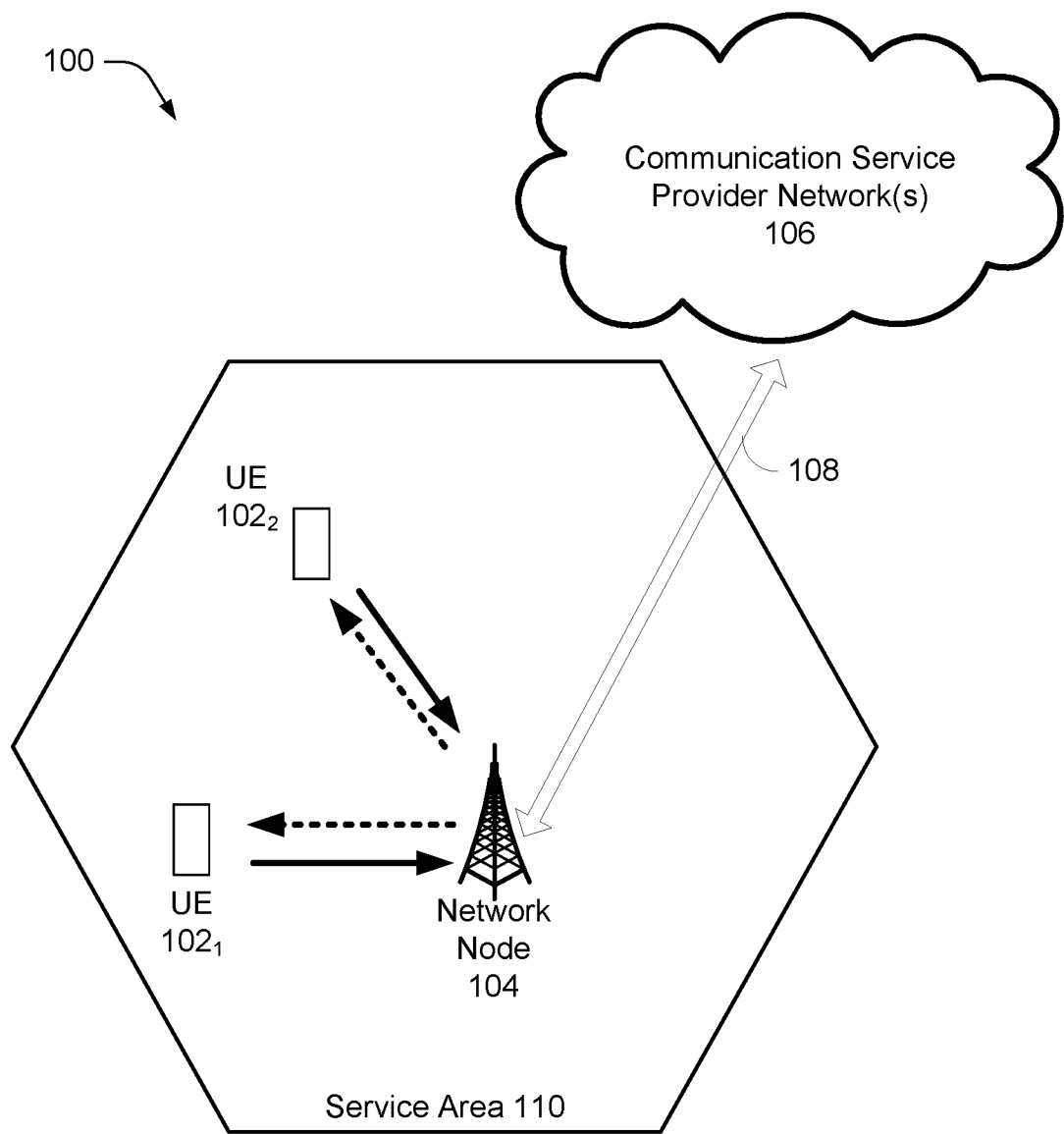
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards network slicing for private cellular networks (PCNs). Network slicing can be leveraged as described herein to meet security requirements and/or other policies applicable to PCNs, and network slicing can furthermore simplify implementation and operation of PCNs. Network slices implemented according to this disclosure can comprise a private network slice, a public network slice (also referred to herein as a mobility network slice), and a public safety network slice (also referred to herein as a FirstNet slice). User equipment (UEs) can be provisioned with slice identifiers for the network slices, and applications at the UEs can specify an appropriate slice identifier for their network communications. Network equipment can be configured to route application traffic to a specified slice and to allocate network resources according to the specified slice, as well as to implement security and other policies according to the specified slice. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, cNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

FIG. 1 illustrates a non-limiting example of a wireless communication system 100 which can be used in connection with at least some embodiments of the subject disclosure. In one or more embodiments, system 100 can comprise one or more user equipment UEs 1021, 1022, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IoT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., long term evolution frequency division duplexing/time division duplexing (LTE FDD/TDD), global system for mobile communications (GSM)/GSM EDGE Radio Access Network (GERAN), code division multiple access (CDMA), CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., orthogonal frequency division multiplexing (OFDM), cyclic prefix OFDM (CP-OFDM), discrete fourier transform (DFT)-spread OFMD, universal filtered multi-carrier (UFMC), fixed mobile and broadband convergence (FMBC), etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for multi radio access bearer (RAB) on some carriers (that is, data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, augmented reality/virtual reality (AR/VR) head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies, e.g., greater than six gigahertz (GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mm Wave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third generation partnership project (3GPP) and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
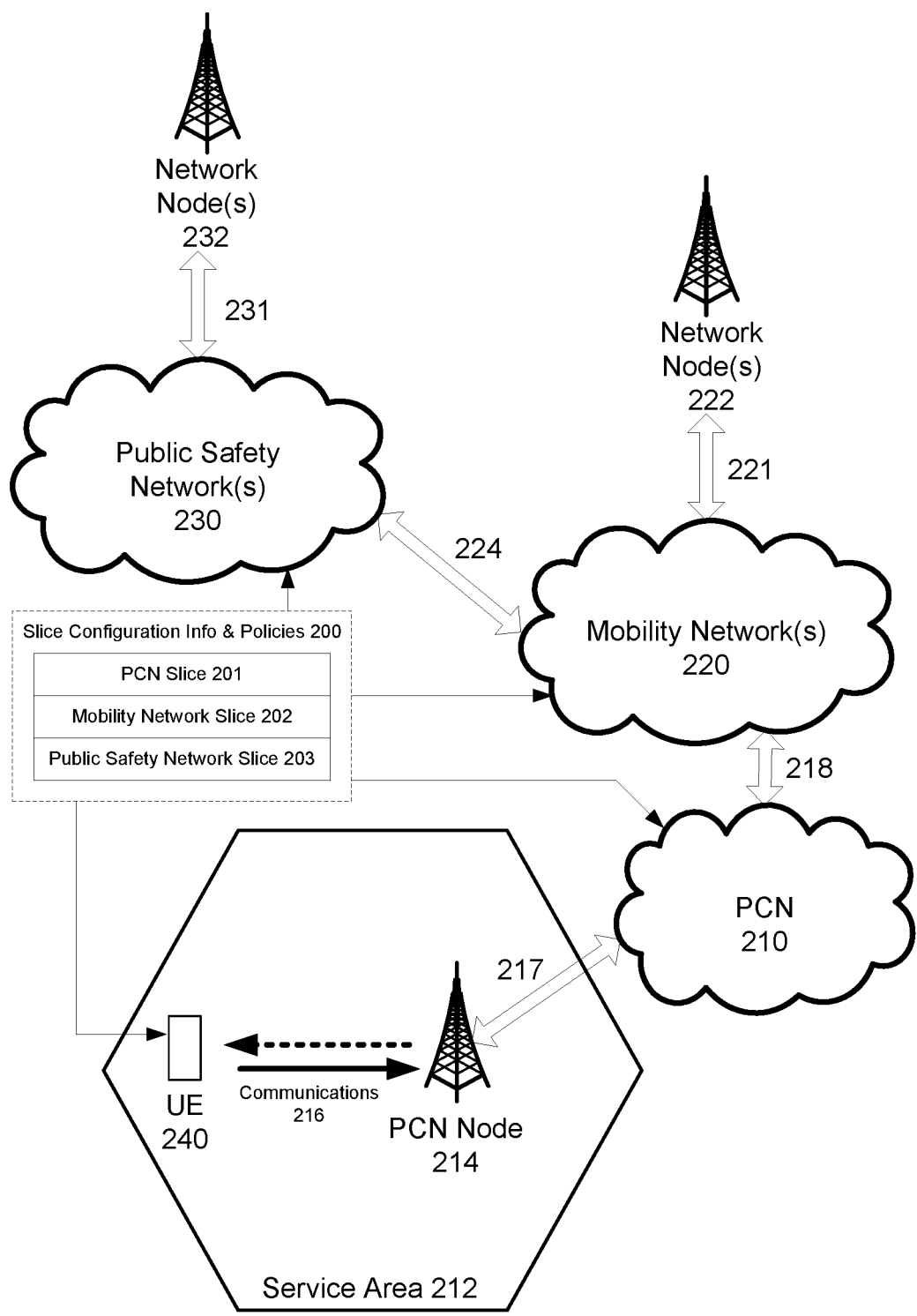
FIG. 2 illustrates an example user equipment (UE), an example private cellular network (PCN), example mobility network(s), and example public safety network(s), all configured to use example network slices in accordance with various aspects and embodiments of the subject disclosure.

FIG. 2 illustrates an example user equipment (UE), an example private cellular network (PCN), example mobility network(s), and example public safety network(s), all configured to use example network slices in accordance with various aspects and embodiments of the subject disclosure. FIG. 2 includes PCN 210, a backhaul link 217, and a network node 214 that has a service area 212. FIG. 2 furthermore includes mobility network(s) 220, backhaul link 221, and network node(s) 222. FIG. 2 furthermore includes public safety network(s) 230, backhaul link 231, and network node(s) 232. The PCN 210 is communicatively coupled with the mobility network(s) 220 via a communications link 218, and the mobility network(s) 220 are communicatively coupled with the public safety network(s) 230 via a communications link 224.

FIG. 2 furthermore includes a UE 240. In an example scenario illustrated in FIG. 2, the UE 240 is connected with the network node 214, such that the UE 240 can send and receive communications 216 via the network node 214.

FIG. 2 furthermore includes slice configuration information and policies 200. Slice configuration information and policies 200 can include, e.g., information and policies pertaining to PCN slice 201, mobility network slice 202, and public safety network slice 203. Arrows from slice configuration information and policies 200 indicate that the PCN 210, the mobility network(s) 220, the public safety network(s) 230, and the UE 240 can be configured according to the slice configuration information and policies 200.

In FIG. 2, the UE 240 can implement aspects of a UE 102 introduced in FIG. 1, the PCN 210, mobility network(s) 220, and public safety network(s) 230 can implement aspects of the communication service provider network(s) 106 introduced in FIG. 1, the network nodes 214, 222, and 232 can implement aspects of the network node 104 introduced in FIG. 1, the backhaul links 217, 221, and 231 can implement aspects of the backhaul link 108 introduced in FIG. 1, and the service area 212 can implement aspects of the service area 110 introduced in FIG. 1.

Embodiments of this disclosure can use network slicing and slice-based authentication mechanisms to meet differentiated quality of service (QOS) and security requirements for 5G and subsequent generation PCNs, hybrid cellular networks including PCNs and public mobility networks, and hybrid cellular networks including PCNs, public mobility networks, and FirstNet networks. Network slicing is a powerful technology that can be deployed and configured in many ways. The use of network slicing to support a PCN by employing a PCN slice 201, a mobility network slice 202, and/or a public safety network slice 203 is a novel deployment of network slicing technology to solve various problems experienced in existing PCN installations. In an aspect, the PCN slice 201, mobility network slice 202, and public safety network slice 203 comprise designations of network types, rather than, e.g. designations of specific networks via public land mobile network identifiers (PLMN-IDs). Embodiments of this disclosure can leverage network slicing and optionally slice-based authentication mechanisms to meet stringent requirements for security control, as well as to simplify implementation and operations of PCNs.

Implementations according to FIG. 2 can comprise up to three, and in some embodiments, only three network slices for use with UE 240, namely the PCN slice 201, the mobility network slice 202, and/or the public safety network slice 203. UEs such as example UE 240 need not necessarily include more than one SIM, and UE 240 can be provisioned with single slice IDs comprising, e.g., network slice selection assistance information (S-NSSAI) for each of the network slices: a PCN slice ID, a mobility network slice ID, and a FirstNet slice ID.

Applications at the UE 240 can specify a slice ID, e.g., the PCN slice ID and/or data network name (DNN) to ensure corresponding requirements are met, e.g., applications can specify the PCN slice ID to ensure stringent PCN security requirements are met. Furthermore, a UE route selection policy (URSP) at the UE 240 can optionally enable the UE 240 to assign a specific portable data unit (PDU) session to a slice ID, such as the PCN slice ID. UE 240 can optionally be preconfigured to support a URSP that includes policies pertaining to a PCN slice.

Network equipment at the PCN 210, the mobility network(s) 220, and the public safety network(s) 230 can be configured to apply policies to network traffic, according to the network slice specified at the UE 240. For example, an enterprise device manager at the PCN 210 can be configured to request the PCN slice type and route all enterprise application traffic to the PCN slice. Configuration of the PCN slice can be in part via the URSP. A common access and mobility management function (AMF) accessible by the PCN 210, along with a network slice selection function (NSSF) accessible by the PCN 210 can be responsible for allocating network function resources, e.g., resources of a session management function (SMF) and resources of a user plane function (UPF), based on S-NSSAI values within a slice, e.g., within the PCN slice. In some embodiments, a policy for a PCN slice can specify security requirements, such as end-to-end encryption and/or slice-based authentication mechanisms for use at the UE 240 after UE 240 registration. An example slice-based authentication mechanism can leverage a secondary authentication on top of a SIM authentication, wherein the secondary authentication is specific for use of a given slice ID, e.g., the PCN slice ID.

In an example according to FIG. 2, the UE 240 can run any of multiple different applications, and the applications can specify use of either the PCN slice 201, the mobility network slice 202, or the public safety network slice 203. An example first application at UE 240 can specify the PCN slice 201 in connection with communications 216. The PCN 210 can apply corresponding policies for the PCN slice 201 in connection with communications 216. For example, the PCN 210 may apply certain network resources, enforce PCN security requirements, and optionally may ensure processing of communications 216 within the PCN 210, so that sensitive data is not exposed to outside networks such as mobility network(s) 220.

An example second application at UE 240 can specify the mobility network slice 202 in connection with communications 216. The PCN 210 can apply corresponding policies for the mobility network slice 202 in connection with communications 216. For example, the PCN 210 may apply certain network resources and QoS requirements, and the PCN 210 may forward communications 216 for processing via the mobility network(s) 220. The mobility network(s) 220 can furthermore process communications 216 according to any mobility network policies corresponding to the mobility network slice 202.

An example third application at UE 240 can specify the public safety network slice 203 in connection with communications 216. The PCN 210 can apply corresponding policies for the public safety network slice 203 in connection with communications 216. For example, the PCN 210 may apply certain network resources and QoS requirements, and the PCN 210 may forward communications 216 for processing via the mobility network(s) 220. The mobility network(s) 220 may also apply network resources and QoS requirements according to policies for the public safety network slice 203, and the mobility network(s) 220 may forward communications 216 for processing via the public safety network(s) 230. The public safety network(s) 230 can furthermore process communications 216 according to any public safety network policies corresponding to the public safety network slice 203.

Figure 3:
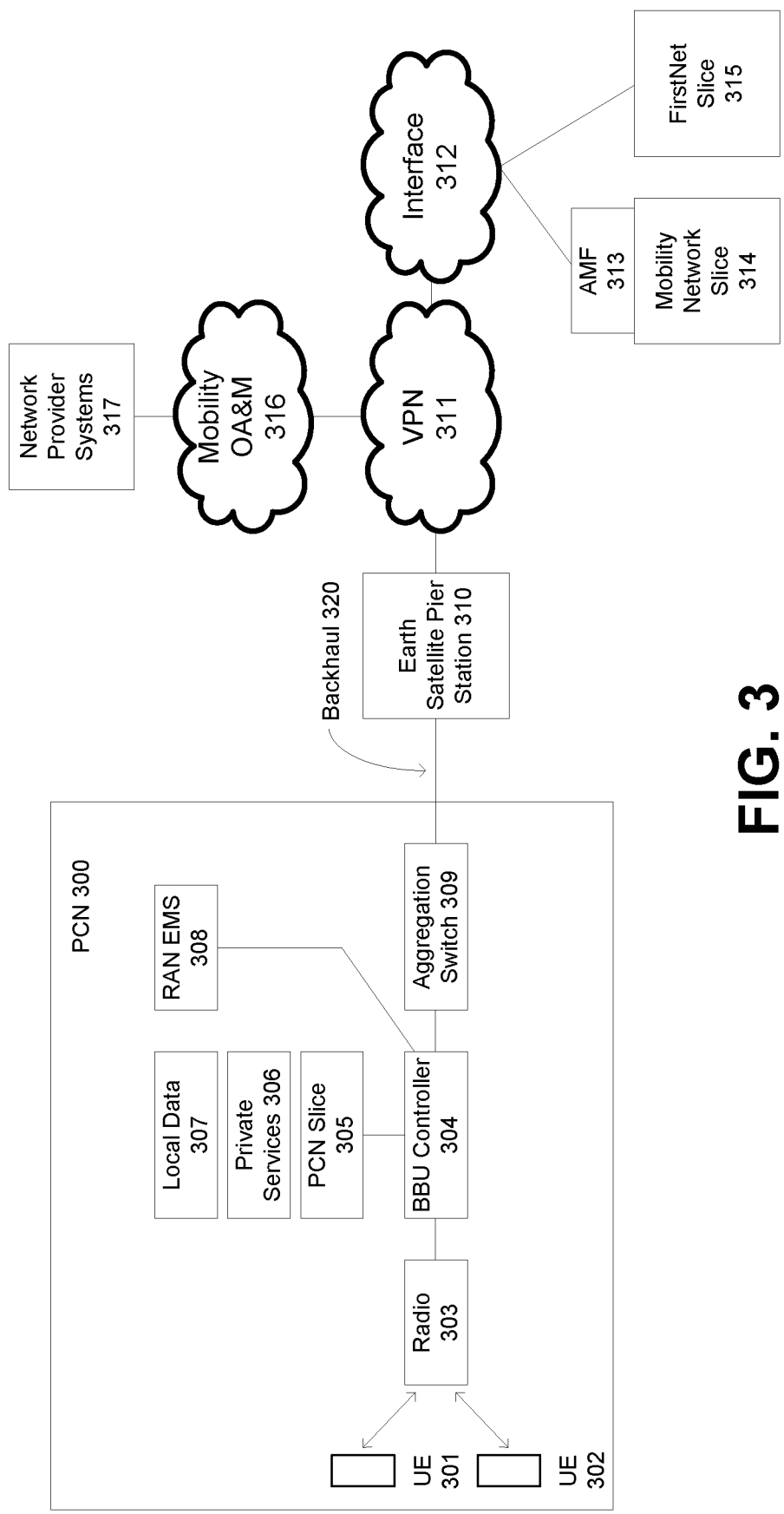
FIG. 3 illustrates an example arrangement of network equipment, in accordance with various aspects and embodiments of the subject disclosure.

FIG. 3 illustrates an example arrangement of network equipment, in accordance with various aspects and embodiments of the subject disclosure. FIG. 3 includes an example PCN 300 comprising a radio 303, a baseband unit (BBU) controller 304, a PCN slice 305, private services 306, local data 307, a RAN element management system (EMS) 308, and an aggregation switch 309. Example UEs 301 and 302 can connect to the radio 303. A backhaul 320 connects the PCN 300 to an earth satellite pier station 310. The earth satellite pier station 310 connects to public network infrastructure, such as Virtual Private Network (VPN) 311, mobility operations, administration and management (OA&M) 316 and network provider systems 317. An interface 312 can connect to an access and mobility management function (AMF) and a mobility network slice 314, and/or to a FirstNet slice 315.

Some embodiments according to this disclosure can be configured to address needs of network slices, e.g., a PCN slice, a mobility network slice, and a public service network slice, based on pre-defined policies that can be a part of a service discovery mechanism. For example, if a FirstNet slice 315 has end-to-end internet protocol security (IPSec) encryption as a requirement, then during initial slice authentication, a network, such as the PCN 300, can check the policy for the FirstNet slice 315 that is being invoked. When end-to-end IPSec encryption is prebuilt in the policy, the slice that is created, e.g., FirstNet slice 315, can have rule-based IPSec implemented across the network originating from the RAN to the core network on the user plane side.

In another example, network slicing combined with URSPs can provide more granular policy control for invoking a network slice. Consider an application on a FirstNet device, e.g., UE 301, that uses evolved multimedia broadcast multicast services (cMBMS) as a service enabler for delivering optimized video service. The application on the UE 301 can first check a policy for URSP selection, which in turn can trigger a network based policy that is predefined, in the core network, for eMBMS creation for the specific slice, e.g., the FirstNet slice. Such an approach provides a mechanism to invoke the eMBMS service which is specific for a slice and based on application logic.

Figure 4:
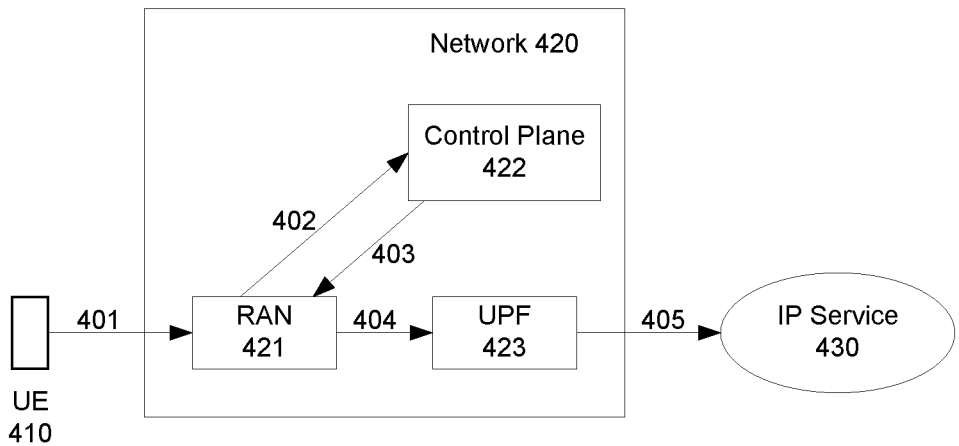
FIG. 4 is a block diagram including an example UE and network equipment which can be configured to carry out example operations, in accordance with various aspects and embodiments of the subject disclosure.

FIG. 4 is a block diagram including an example UE and network equipment which can be configured to carry out example operations, in accordance with various aspects and embodiments of the subject disclosure. FIG. 4 includes a UE 410, a network 420, and an IP service 430. The network 420 comprises a RAN 421, a control plane 422, and a user plane function (UPF) 423.

In example operations according to FIG. 4, the UE 410, which can comprise, e.g., a FirstNet UE, can request a network slice that has a particular policy, e.g., a slice that has user plane encryption as a security requirement. At operation 401, the UE 410 can register on the RAN 421 with a registration request. At operation 402, the RAN 421 can send the registration request to the core network control plane 422 for authentication and authorization, followed by service discovery. At operation 403, the core network control plane 422 can check a policy associated with the UE 410, or an associated subscriber, and the core network control plane 422 can identify a predefined policy, e.g., an end-to-end user plane encryption policy. Operation 403 can furthermore trigger functions such as user plane IPSec encryption creation and slice ID definition. At operations 404 and 405, based on the response from the core network control plane 422, the RAN 421 can initiate user plane IPSec encryption across the data plane, e.g., across the UPF 423 and IP service 430.

Figure 5:
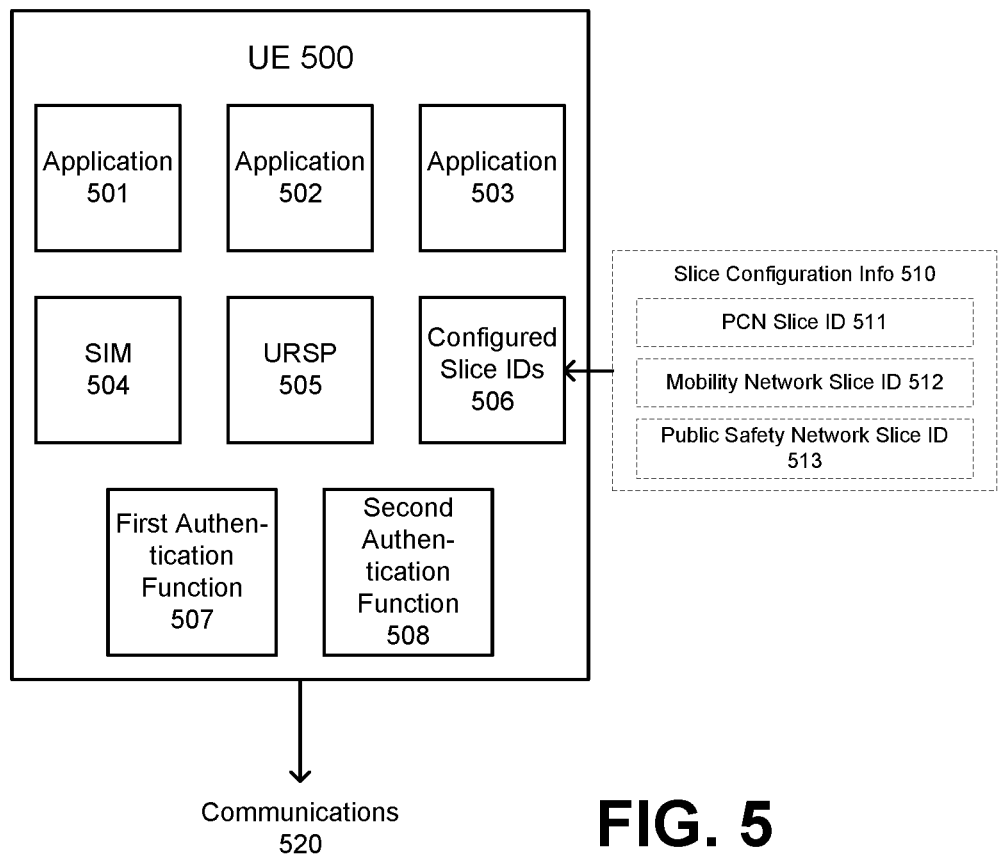
FIG. 5 illustrates an example UE adapted to employ network slices in accordance with various aspects and embodiments of the subject disclosure.

FIG. 5 illustrates an example UE adapted to employ network slices in accordance with various aspects and embodiments of the subject disclosure. The example UE 500 includes example applications 501, 502, and 503, SIM 504, URSP 505, configured slice IDs 506, first authentication function 507 and second authentication function 508. The configured slice IDs 506 can include slice configuration information 510, including, e.g., a PCN slice ID 511, a mobility network slice ID 512, and a public safety network slice ID 513.

The UE 500 can implement, e.g., the UE 240, the UEs 301, 302, and/or the UE 410, in some embodiments. The UE 500 can be equipped with SIM 504 and can be provisioned with configured slice IDs 506. The configured slice IDS 506 can comprise, e.g., three S-NSSAIs, including a first S-NS-SAI for PCN slice ID 511, a second S-NSSAI for mobility network slice ID 512, and a third S-NSSAI for public safety network slice ID 513. Applications 501, 502, and 503 can be configured to specify any of the slice IDs 511, 512, or 513 in connection with communications 520. Furthermore, the URSP 505 can enable the UE 500 to assign a specific PDU session to a slice ID 511, 512, or 513. When a network slice policy corresponding to PCN slice ID 511, mobility network slice ID 512, or public safety network slice ID 513 requires additional UE 500 authentication, a second, slice-based authentication function 508 can be activated at UE 500, in addition to the first authentication function 507 that is used during UE 500 registration. The secondary authentication function can therefore provide additional UE 500 authentication for use of a given slice ID, in addition to SIM 504 authentication enabled by the first authentication function 507.

Figure 6:
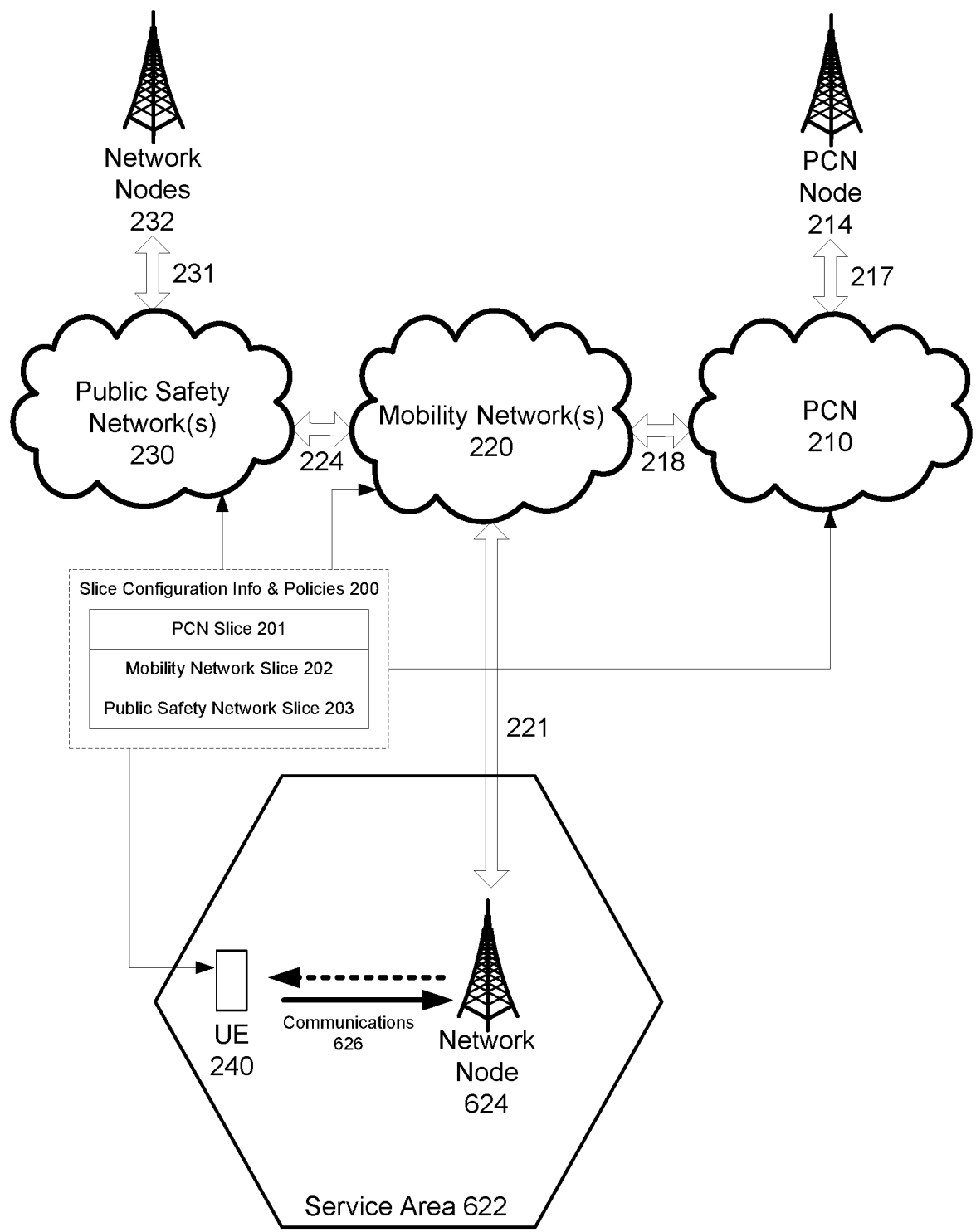
FIG. 6 illustrates the example UE, PCN, mobility network(s), and public safety network(s) of FIG. 2, in a scenario wherein the UE connects to the mobility network(s), in accordance with various aspects and embodiments of the subject disclosure.

FIG. 6 illustrates the example UE, PCN, mobility network(s), and public safety network(s) of FIG. 2, in a scenario wherein the UE connects to the mobility network(s), in accordance with various aspects and embodiments of the subject disclosure. FIG. 6 includes the PCN 210, mobility network(s) 220, and public safety network(s) 230 introduced in FIG. 2. FIG. 6 furthermore includes the backhaul link 217 connecting PCN 210 and network node 214, and the backhaul link 231 connecting public safety network(s) 230 and network node(s) 232. In FIG. 6, a representative network node 624 can comprise one of the network nodes 222 introduced in FIG. 2, and the backhaul link 221 can connect mobility network(s) 220 and network node 624. The network node 624 can have a service area 622.

FIG. 6 also includes the slice configuration information and policies 200 introduced in FIG. 2, including information and policies pertaining to PCN slice 201, mobility network slice 202, and public safety network slice 203. The PCN 210, the mobility network(s) 220, the public safety network(s) 230, and the UE 240 can be configured according to the slice configuration information and policies 200, as described with reference to FIG. 2.

In an example scenario illustrated in FIG. 6, the UE 240 is connected with the network node 624, such that the UE 240 can send and receive communications 626 via the network node 624. Embodiments of this disclosure are sufficiently flexible to allow application of the different policies corresponding to PCN slice 201, mobility network slice 202, and public safety network slice 203, regardless of which network the UE 240 connects to. For example, the UE 240 can connect to the mobility network(s) 220, as illustrated in FIG. 6, or to the PCN 210, as illustrated in FIG. 2, and the different policies corresponding to PCN slice 201, mobility network slice 202, and public safety network slice 203 can be applied regardless of which network the UE 240 is directly connected to.

In one scenario, a policy for the PCN slice 201 can optionally specify that that the UE 240 must be directly connected to the PCN 210 in order to employ the PCN slice 201. For example, the UE 240 must be directly connected to a PCN node 214 as illustrated in FIG. 2. In such a scenario, when communications 626 include PCN slice communications, the mobility network(s) 220 can be adapted to return an error. However, other potential arrangements according to this disclosure allow any desired level of security to be employed in connection with policies for PCN slice 201, and the mobility network(s) 220 can optionally be configured to apply the applicable security policies and proceed with processing communications 626 that include PCN slice communications. The security level of PCN slice communications can be any desired security level, according to a PCN slice policy, which can optionally include disallowing PCN communications entirely when the UE 240 is not connected directly to the PCN node 214.

In some examples according to FIG. 6, the UE 240 can execute any of multiple different applications, and the applications can specify use of either the PCN slice 201, the mobility network slice 202, or the public safety network slice 203. An example first application at UE 240 can specify the PCN slice 201 in connection with communications 626. The mobility network(s) 220 can apply corresponding policies for the PCN slice 201 in connection with communications 626. For example, the mobility network(s) 220 may apply certain network resources and QoS requirements and can enforce PCN security requirements. The mobility network(s) 220 can forward communications 626 for processing via the PCN 210. The PCN 210 can furthermore process communications 626 according to any PCN 210 policies corresponding to the PCN slice 201.

An example second application at UE 240 can specify the mobility network slice 202 in connection with communications 626. The mobility network(s) 220 can apply corresponding policies for the mobility network slice 202 in connection with communications 626. For example, the mobility network(s) 220 can apply corresponding network resources and QoS requirements.

An example third application at UE 240 can specify the public safety network slice 203 in connection with communications 626. The mobility network(s) 220 can apply corresponding policies for the public safety network slice 203 in connection with communications 626. For example, the mobility network(s) 220 can apply corresponding network resources and QoS requirements, and the mobility network(s) 220 may forward communications 626 for processing via the public safety network(s) 230. The public safety network(s) 230 can furthermore process communications 626 according to any public safety network policies corresponding to the public safety network slice 203.

Figure 7:
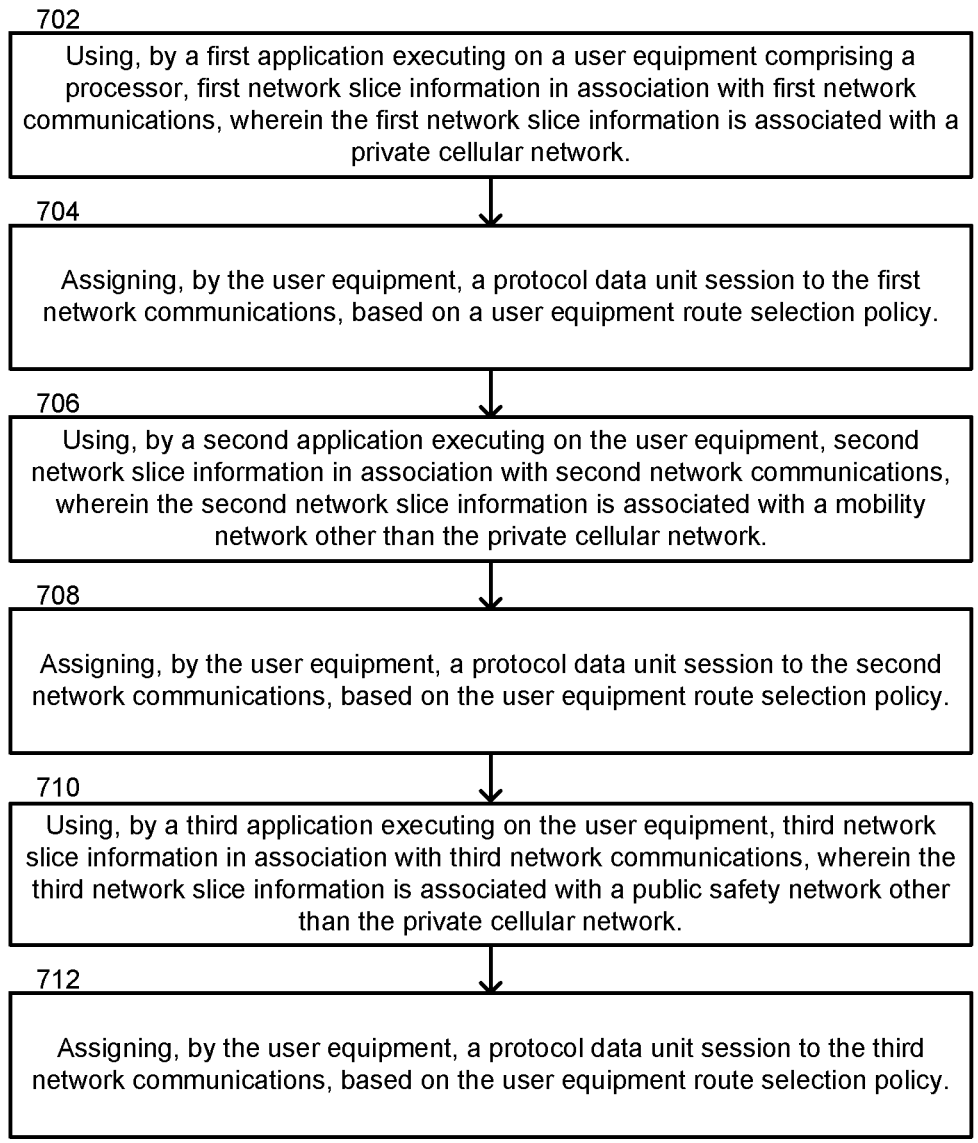
FIG. 7 is a flow diagram representing example operations of user equipment, in accordance with various aspects and embodiments of the subject disclosure.

FIG. 7 is a flow diagram representing example operations of user equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by UE 240, as illustrated in FIG. 2. Example operation 702 comprises using, by a first application executing on the UE 240 comprising a processor, first network slice information 201 in association with first network communications (e.g. a first instance of communications 216), wherein the first network slice information 201 is associated with a private cellular network 210.

A first policy function of the PCN 210 can be configured to apply a PCN 210 policy to the first network communications 216 associated with the first network slice information 201. In some embodiments, the PCN policy can comprise, e.g., a security requirement applicable to the first network communications 216. The security requirement can comprise, e.g., an end-to-end encryption requirement applicable to the first network communications 216. Another example security requirement is an authentication requirement applicable to the first network communications 216, whereby the UE 240, the application, or the user of the UE 240 must be authenticated according to the authentication requirement.

Example operation 704 comprises assigning, by the user equipment 240, a protocol data unit session to the first network communications 216, based on a user equipment route selection policy. Referring to FIG. 5, a UE can use a URSP 505 to assign a protocol data unit session to the first network communications 216.

Example operation 704 comprises using, by a second application executing on the user equipment 240, second network slice information 202 in association with second network communications (e.g. a second instance of communications 216), wherein the second network slice information 202 is associated with a mobility network 220 other than the private cellular network 210.

A second policy function of the mobility network 220 can be configured to apply a mobility network 220 policy to the second network communications 216 associated with the second network slice information 202. In some embodiments, the mobility network 220 policy can comprise, e.g., a QoS policy, a security policy, and/or policies regarding application of specified network resources.

Example operation 706 comprises using, by a third application executing on the user equipment 240, third network slice information 203 in association with third network communications (e.g. a third instance of communications 216), wherein the third network slice information 203 is associated with a public safety network 230 other than the private cellular network 210. The public safety network 230 can comprise, e.g., a FirstNet communications network.

A policy function of the public safety network 230 can be configured to apply a public safety network 230 policy to the third network communications 216 associated with the third network slice information 203. In some embodiments, the public safety network 230 policy can comprise, e.g., a QoS policy, a security policy, and/or policies regarding application of certain network resources.

It should be noted that, in addition to enforcing their own policies, the PCN 210, the mobility network 220, and the public safety network 230 can each be configured to apply the policies associated with other network slices, namely the policies associated with the PCN slice 201, the mobility network slice 202, and the public safety network slice 203. In some embodiments, the user equipment 240 can be provisioned with slice information comprising only the first network slice information 201, the second network slice information 202, and the third network slice information 203. In other embodiments, the UE 240 can be provisioned with further slice information and/or subsets of the slice information 201, 202, and 203.

Figure 8:
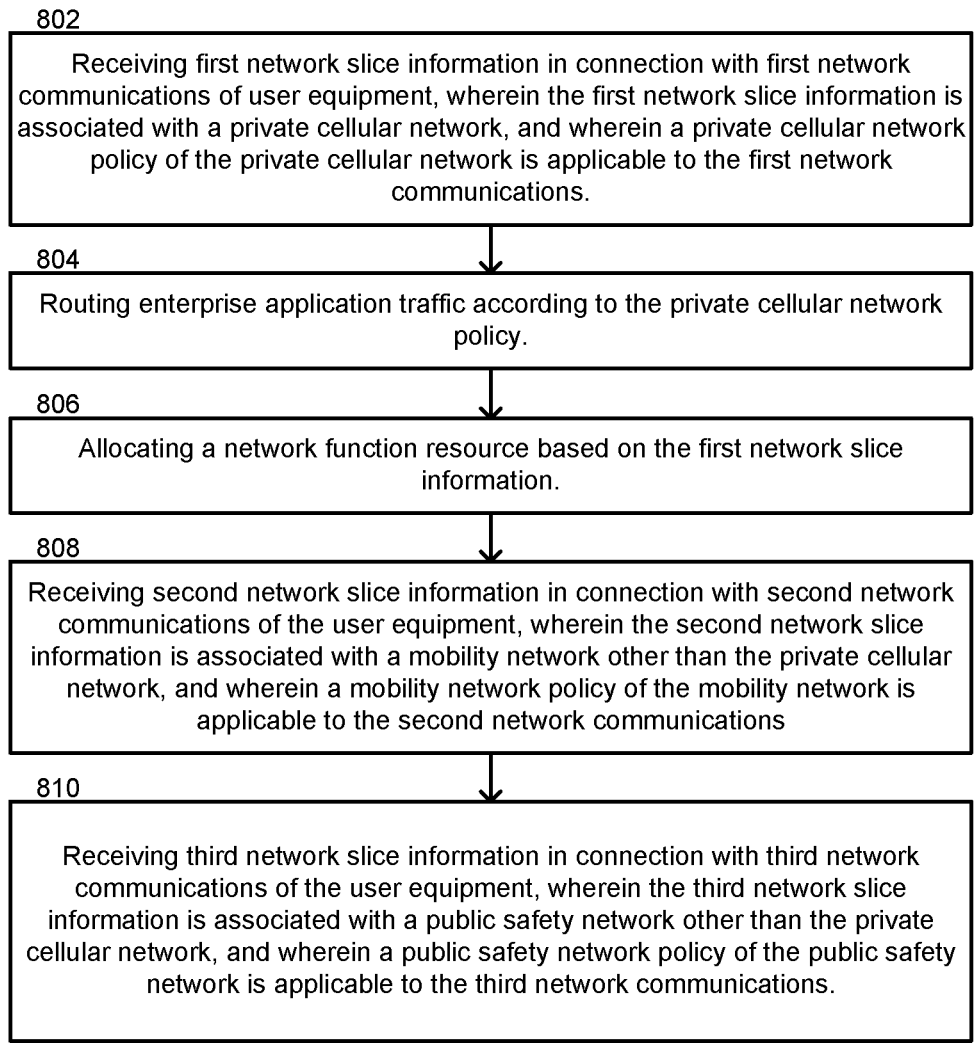
FIG. 8 is a flow diagram representing example operations of network equipment, in accordance with various aspects and embodiments of the subject disclosure.

FIG. 8 is a flow diagram representing example operations of network equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by the network equipment of the PCN 210, the mobility network(s) 220, or the public safety network(s) 230, as illustrated in FIG. 2 and FIG. 6. Representative operations of the mobility network(s) 220 will be described herein, in a scenario such as illustrated in FIG. 6, with the understanding the PCN 210 and the public safety network(s) 230 can perform similar operations. Example operation 802 comprises receiving first network slice information 201 in connection with first network communications (e.g., a first instance of communications 626) of user equipment 240, wherein the first network slice information 201 is associated with a private cellular network 210, and wherein a private cellular network policy of the private cellular network 210 is applicable to the first network communications 626. In some embodiments, the private cellular network policy can comprise a security requirement. The security requirement can comprise, e.g., at least one of an end-to-end encryption requirement, or an authentication requirement.

Example operation 804 comprises routing enterprise application traffic according to the private cellular network policy. For example, in some embodiments, the first network communications 626 of the user equipment 240 can comprise enterprise application traffic, for an enterprise application supported by the PCN 210, and the enterprise application traffic can be routed within the mobility network(s) 220 as well as within the PCN 210 according to the PCN policy.

Example operation 806 comprises allocating a network function resource based on the first network slice information 201. For example, an AMF along with a NSSF accessible by the mobility network(s) 220 can be responsible for allocating network function resources, e.g., resources of a SMF and resources of a UPF, based on S-NSSAI values of PCN slice 201, mobility network slice 202, or public safety network slice 203.

Example operation 808 comprises receiving second network slice information 202 in connection with second network communications (e.g., a second instance of communications 626) of the user equipment 240, wherein the second network slice information 202 is associated with a mobility network 220 other than the private cellular network 210. A mobility network policy of the mobility network 220 can be applicable to the second network communications 626, and such policy can be applied by the receiving network, e.g., the mobility network(s) 220 in the present example.

Example operation 810 comprises receiving third network slice information 203 in connection with third network communications (e.g., a third instance of communications 626) of the user equipment 240, wherein the third network slice information 203 is associated with a public safety network 230 other than the private cellular network 210. A public safety network policy of the public safety network 230 can be applicable to the third network communications 626, and such policy can be applied by the receiving network, e.g., the mobility network(s) 220 in the present example, as well as by other networks, e.g., the public safety network 230, after the third network communications 626 are forwarded to such other networks. The public safety network 230 can comprise, e.g., a FirstNet type communications network.

Figure 9:
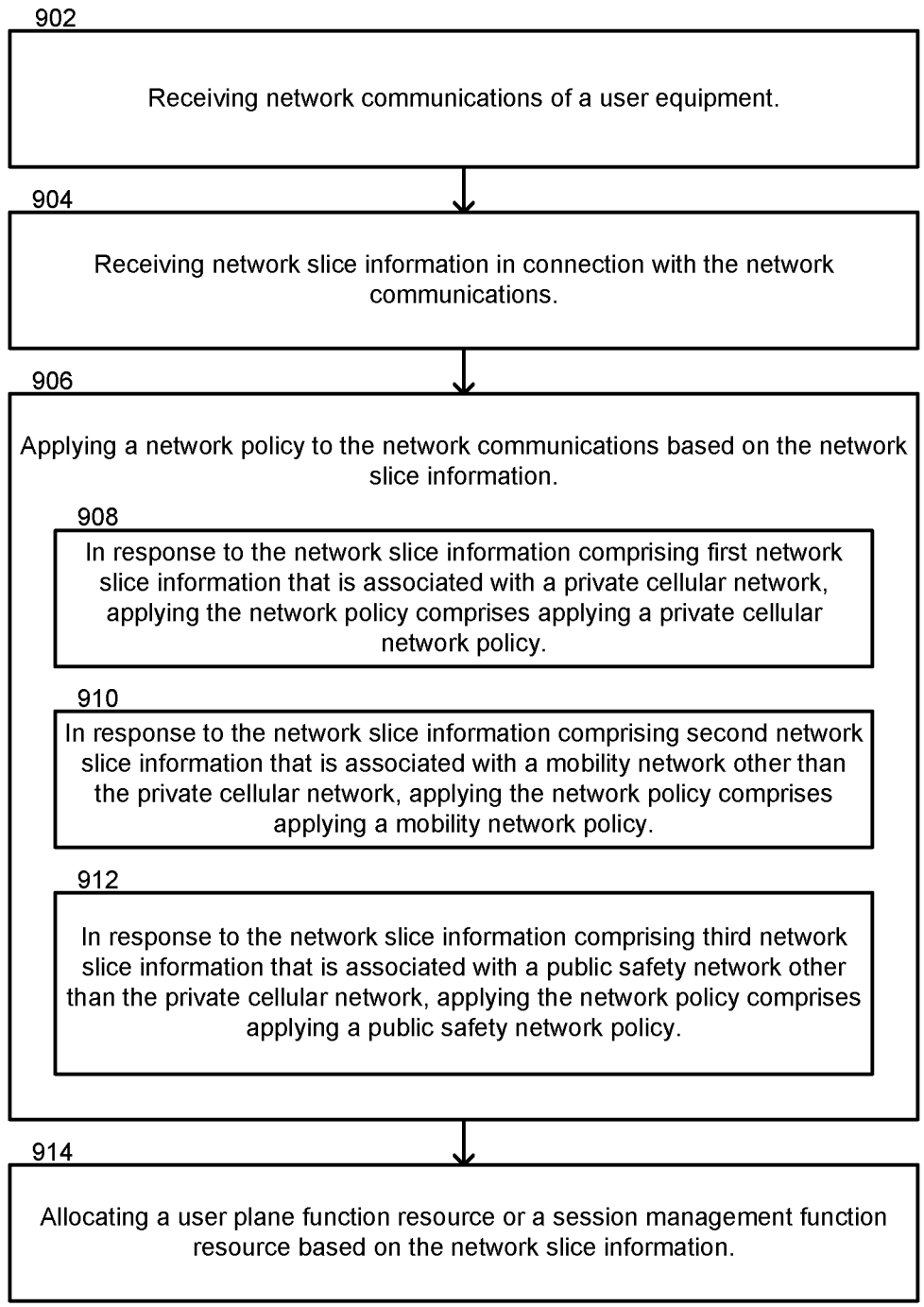
FIG. 9 is a flow diagram representing another set of example operations of network equipment, in accordance with various aspects and embodiments of the subject disclosure.

FIG. 9 is a flow diagram representing another set of example operations of network equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by the network equipment of the PCN 210, the mobility network(s) 220, or the public safety network(s) 230, as illustrated in FIG. 2 and FIG. 6. Representative operations of the PCN 210 will be described herein, in a scenario such as illustrated in FIG. 2, with the understanding the mobility network(s) 220 and the public safety network(s) 230 can perform similar operations. Example operation 902 comprises receiving network communications, e.g., communications 216, of a user equipment 240.

Example operation 904 comprises receiving network slice information, such as a slice identifier for PCN slice 201, mobility network slice 202, or public safety network slice 203, in connection with the network communications 216.

Example operation 906 comprises applying a network policy to the network communications 216, i.e., the communications received at operation 902, based on the network slice information, i.e., the network slice information received at operation 904. Example operation 906 can apply a network policy of a network that corresponds to the network slice information, pursuant to operation 908, 910, or 912.

Example operation 908 indicates that, in response to the network slice information comprising first network slice information 201 that is associated with a private cellular network 210, applying the network policy at operation 906 comprises applying a private cellular network policy. In one example, the private cellular network policy can comprise, e.g., a requirement to process the network communications 216 within the private cellular network 210. In another example, the private cellular network policy can comprise, e.g., an end-to-end encryption requirement applicable to encryption of communications 216. In another example, the private cellular network policy can comprise, e.g., a second authentication requirement applicable to the user equipment 240, wherein the second authentication requirement supplements a first authentication requirement applicable to the user equipment 240 such as a SIM authentication of the UE 240 during UE 240 registration.

Example operation 910 indicates that, in response to the network slice information comprising second network slice information 202 that is associated with a mobility network 220 other than the private cellular network 210, applying the network policy at operation 906 comprises applying a mobility network policy. Any mobility network policy can be applied and this disclosure is not limited to any particular policy. QoS policies, security policies, and network resource policies are some examples.

Example operation 912 indicates that, in response to the network slice information comprising third network slice information 203 that is associated with a public safety network 230 other than the private cellular network 210, applying the network policy at operation 906 can comprise applying a public safety network policy. Any public safety network policy can be applied and this disclosure is not limited to any particular policy. QoS policies, security policies, and network resource policies are some examples.

Example operation 914 comprises allocating a user plane function resource or a session management function resource based on the network slice information. For example, user plane function resources or session management function resources can be allocated based on policies associated with the first network slice information 201, the second network slice information 202, or the third network slice information 203.

Figure 10:
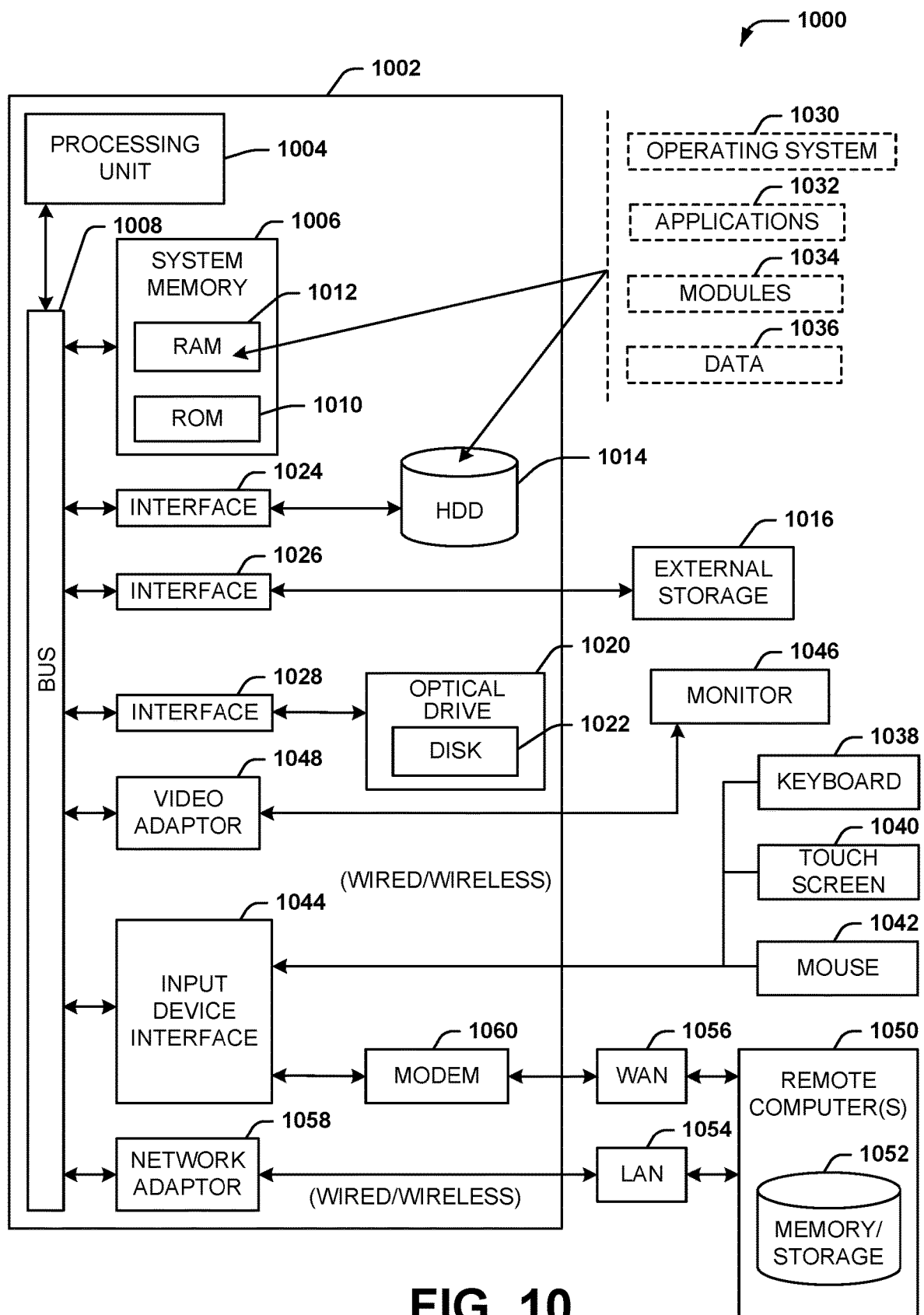
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
using, by a first application executing on a user equipment comprising a processor, first network slice information in association with first network communications, wherein the first network slice information is associated with a private cellular network, wherein a first policy function of the private cellular network is configured to apply a private cellular network policy to the first network communications associated with the first network slice information, wherein the private cellular network policy comprises a second authentication requirement applicable to the user equipment, and wherein the second authentication requirement supplements a first authentication requirement applicable to the user equipment; and
using, by a second application executing on the user equipment, second network slice information in association with second network communications, wherein the second network slice information is associated with a mobility network other than the private cellular network, wherein a second policy function of the mobility network is configured to apply a mobility network policy to the second network communications associated with the second network slice information.

2. The method of claim 1, further comprising using, by a third application executing on the user equipment, third network slice information in association with third network communications, wherein the third network slice information is associated with a public safety network other than the private cellular network.

3. The method of claim 2, wherein the public safety network comprises a first net communications network.

4. The method of claim 2, wherein the user equipment is provisioned with slice information comprising only the first network slice information, the second network slice information, and the third network slice information.

5. The method of claim 1, further comprising assigning, by the user equipment, a protocol data unit session to the first network communications, based on a user equipment route selection policy.

6. The method of claim 1, wherein the private cellular network policy further comprises a security requirement applicable to the first network communications.

7. The method of claim 6, wherein the security requirement comprises an end-to-end encryption requirement applicable to the first network communications.

8. The method of claim 6, wherein the security requirement comprises an authentication requirement applicable to the first network communications.

9. Network equipment, comprising:
a processor; and
a memory that stores executable instructions that, when executed by the processor, facilitate performance of operations, the operations comprising:
receiving first network slice information in connection with first network communications of user equipment, wherein the first network slice information is associated with a private cellular network, wherein a private cellular network policy of the private cellular network is applicable to the first network communications, wherein the private cellular network policy comprises a second authentication requirement applicable to the user equipment, and wherein the second authentication requirement supplements a first authentication requirement applicable to the user equipment; and
receiving second network slice information in connection with second network communications of the user equipment, wherein the second network slice information is associated with a mobility network other than the private cellular network, wherein a mobility network policy of the mobility network is applicable to the second network communications.

10. The network equipment of claim 9, wherein the operations further comprise:
receiving third network slice information in connection with third network communications of the user equipment, wherein the third network slice information is associated with a public safety network other than the private cellular network, wherein a public safety network policy of the public safety network is applicable to the third network communications.

11. The network equipment of claim 10, wherein the public safety network comprises a first net communications network.

12. The network equipment of claim 9, wherein the first network communications of the user equipment comprise enterprise application traffic, and wherein the operations further comprise routing the enterprise application traffic according to the private cellular network policy.

13. The network equipment of claim 9, wherein the operations further comprise allocating a network function resource based on the first network slice information.

14. The network equipment of claim 9, wherein the private cellular network policy further comprises a security requirement.

15. The network equipment of claim 14, wherein the security requirement comprises at least one of: an end-to-end encryption requirement or an authentication requirement for the first network communications.

16. A non-transitory machine-readable medium, comprising executable instructions that, when executed by a processor, facilitate performance of operations, the operations comprising:
receiving network communications of a user equipment;
receiving network slice information in connection with the network communications; and
applying a network policy to the network communications based on the network slice information, wherein:
in response to the network slice information comprising first network slice information that is associated with a private cellular network, applying the network policy comprises applying a private cellular network policy, wherein the private cellular network policy comprises a second authentication requirement applicable to the user equipment, and wherein the second authentication requirement supplements a first authentication requirement applicable to the user equipment;

in response to the network slice information comprising second network slice information that is associated with a mobility network other than the private cellular network, applying the network policy comprises applying a mobility network policy; and in response to the network slice information comprising third network slice information that is associated with a public safety network other than the private cellular network, applying the network policy comprises applying a public safety network policy.

17. The non-transitory machine-readable medium of claim 16, wherein the operations further comprise allocating a user plane function resource or a session management function resource based on the first network slice information.

18. The non-transitory machine-readable medium of claim 16, wherein the private cellular network policy comprises a requirement to process the network communications within the private cellular network.

19. The non-transitory machine-readable medium of claim 16, wherein the private cellular network policy further comprises an end-to-end encryption requirement.

20. The non-transitory machine-readable medium of claim 16, wherein the operations further comprise allocating a network function resource based on the first network slice information.

\* \* \* \* \*